Aug. 28, 1962 — R. W. GRAVES — 3,051,515
PRESSURE COMPENSATING EXPANSION JOINT
Filed Aug. 17, 1960

INVENTOR.
ROBERT W. GRAVES
BY
Huebner & Worrel
ATTORNEYS.

United States Patent Office 3,051,515
Patented Aug. 28, 1962

3,051,515
PRESSURE COMPENSATING EXPANSION JOINT
Robert W. Graves, Canoga Park, Calif., assignor to Aeroquip Corporation, Jackson, Mich., a corporation of Michigan
Filed Aug. 17, 1960, Ser. No. 50,260
8 Claims. (Cl. 285—228)

The present invention relates to coupling joints for joining tubular members, and it relates more particularly to a novel fluid-tight joint for connecting ends of tubing, pipe or other cylindrical members, hereinafter referred to as tubes, the joint permitting flexible movement of the tube ends relative to each other axially, radially or angularly, the joint including fluid balancing means which compensates for the axial blow-apart forces on the tube ends due to internal line pressure.

Often it is necessary to provide a joint between ends of tubing which will allow the respective tube ends to move relative to each other to accommodate installation movement, thermal growth movement and other causes of flexing and shifting between the tube ends. However, where substantial fluid pressure is contained in the tubing, most conventional coupling sleeves, such as simple bellows members or rubber-like sleeve members do not by themselves possess sufficient structural strength to withstand the internal forces of the fluid pressure tending to spread the tubing ends apart. It is accordingly frequently necessary to supplement a flexible fluid-tight coupling sleeve with a mechanical coupling device, such as a universal joint, which mechanically ties the tubing ends together against the axial separating or blow-apart pressure in the line. Such mechanical coupling devices are usually excessively bulky and in the way when mounted on the outside of the joint, and substantially impede the flow of fluid through the joint when positioned inside of the joint. Also, these mechanical coupling devices cannot carry the tube end load and simultaneously accommodate relative length change between the tube ends.

In view of these and other problems in the art, it is an object of the present invention to provide a flexible joint for ends of tubing which permits relative movement of the tubing ends axially, radially and angularly, and which includes fluid pressure responsive means to compensate for axial blow-apart pressure in the joint.

Another object of the invention is to provide a flexible joint for tube ends of the character described, which includes flexible bellows means which tends to expand axially of the tubing under line fluid pressure, and means linking the flexible bellows means with both tubing ends tending to draw the tubing ends closer together upon axial expansion of the flexible bellows means, thereby to compensate for the tendency of the line pressure to separate the tubing ends.

Another object of this invention is to provide a fluid-tight joint for ends of tubing wherein the joint is of a flexible and shiftable character, the joint including a pair of open-ended tubular bellows members disposed co-axially of the tubing, one having a smaller mean diameter than the other, a fluid-tight connection between each bellows member adjacent one end thereof and a respective tubing end portion, a fluid-tight connection between the bellows members adjacent their other ends to complete fluid-tight interconnection of the tubing ends, and means linking the larger bellows member adjacent its said other end with both tubing ends whereby internal fluid pressure tending to expand the larger bellows member axially will act through said linking means to urge the tube ends together against internal axial blow-apart pressure in the tubing.

Another object of the present invention is to provide a pressure compensated expansion joint of the character described which is light in weight, simple in construction and low in cost.

Further objects and advantages of this invention will appear during the course of the following part of this specification, wherein the details of construction and mode of operation of a preferred embodiment are described with reference to the accompanying drawing, in which.

Figure 1:
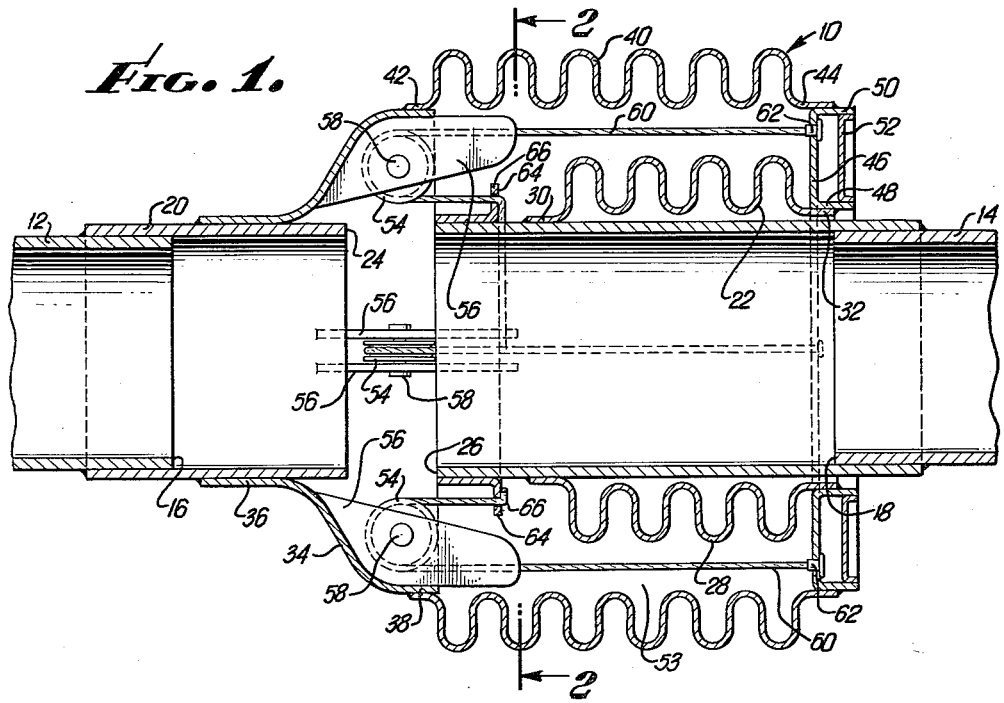
FIG. 1 is an axial section of a joint according to the present invention.
Figure 2:
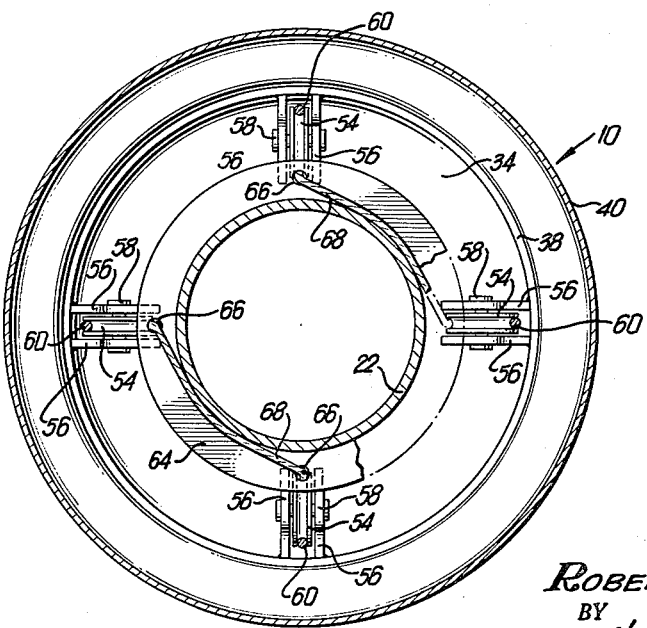
FIG. 2 is a cross-sectional view along the line 2—2 in FIG. 1.

Referring to the drawing, the joint 10 according to the present invention is illustrated as a flexible and shiftable joint for interconnecting a pair of generally axially-aligned tube or pipe members 12 and 14, having respective ends 16 and 18.

For convenience and so that the joint 10 can be completely factory assembled and then easily connected in the field between pipe or tube members such as 12 and 14, it is preferred to include, as parts of the joint 10, a pair of generally axially-aligned and axially-spaced sleeve members 20 and 22 which are adapted to be welded or otherwise secured in fluid-tight relationship to the respective tubes 12 and 14 so that in effect the sleeves 20 and 22 form end extensions of the tubes 12 and 14.

Thus, the sleeves 20 and 22 have opposed, axially-spaced ends 24 and 26, respectively, which, when the joint 10 is operatively disposed to interconnect a pair of tubes, function as the ends of the tubing.

Disposed circumferentially about the sleeve 22 is a generally cylindrical inner bellows member 28. The inner bellows member 28 is integrally connected at one end 30 to the sleeve member 22 in a fluid-tight connection, as by welding, and the inner bellows member 28 extends axially over the sleeve 22 away from the end 26 of sleeve 22, the bellows members 28 terminating at free end 32.

Integrally mounted on the sleeve 20 is a bell-shaped collar member 34 having a neck portion 36 of restricted diameter which is attached to sleeve 20 as by welding, the collar member 34 flaring outwardly toward the other sleeve 22 and terminating at an outermost skirt portion 38 of enlarged diameter.

An outer bellows member 40 of substantially greater mean diameter than the inner bellows member 28 is integrally connected at one end 42 thereof to the skirt portion 38 of collar member 34 in fluid-tight connection. The outer bellows member 40 extends from its fixed end 42 generally coaxially over the inner bellows member 28, terminating at free end 44 which is radially-outwardly disposed from the free end 32 of the inner bellows member 28.

An annular ring 46 is integrally connected in fluid-tight connection at its inner edge 48 with the end 32 of inner bellows member 28, and is similarly integrally connected in fluid-tight connection at its outer edge 50 with the end 44 of the outer bellows member 40. The ring 46 may be of channel-shaped cross-section wherein the bottom of the channel member is oriented generally in a radial plane and extends radially-outwardly from the end 32 of inner bellows member 28 to the end 44 of outer bellows member 40, with the side walls of the channel comprising generally axially-arranged flanges to which the respective ends of the bellows members may be welded or otherwise integrally secured. An annular cap member 52 may be secured between the axially-arranged flange portions of the channel-shaped ring 46 for sealing purposes and to enhance the rigidity of the ring.

Line fluid in the tubes 12 and 14 and the sleeves 20 and 22 will be admitted through the gap between the sleeve ends 24 and 26 into the annular chamber 53 defined between the annular bellows members 28 and 40 and terminating at annular ring 46. The pressure of line fluid in this annular chamber 53 will tend to axially elongate the bellows members 28 and 40, urging the ring 46 in a direction axially away from the end 24 of sleeve 20. This expansion force tending to axially elongate the bellows members and to move the ring 46 axially away from the sleeve 20 is utilized in the present invention to compensate for the force of fluid pressure in the line tending to separate the ends 24 and 26 of respective sleeves 20 and 22 by the provision of internal mechanical linkage which connects the ring 46 with the sleeves 20 and 22 so as to tend to draw the sleeves axially together. Although the present invention is not necessarily limited to a particular type of mechanical linkage for accomplishing this purpose, a presently-preferred form of linkage is illustrated in the drawing, and comprises a plurality of flexible cable members which are connected at one end to the ring 46, extending generally axially through the chamber 53 between the bellows members 28 and 40, passing over a plurality of respective pulley members rotatably connected to the sleeve 20, and then being connected at their other ends to the sleeve 22.

The specific preferred flexible cable and pulley arrangement which is shown in the drawing embodies a plurality of pulley members 54 rotatably mounted on the inside of the bell-shaped collar member 34 between respective pairs of mounting plates 56 which are integrally connected to the collar member 34 as by welding. Four of the pulley members 54 are shown in the drawing, and are disposed in regularly spaced arrangement about the inside of collar member 34. The rotatable mounting of the pulley members 54 between respective pairs of mounting plates 56 is accomplished by respective pulley shafts 58.

A plurality of flexible cable members 60 (four being shown in the drawing) are secured at one end to the annular ring 46 by any suitable means, such as by means of respective ferrules 62, the flexible cable members 60 extending axially through chamber 53 between bellows members 28 and 40 and passing over respective pulley members 54, being fastened at their other ends to a flange member 64 which is integrally supported on the sleeve 22. For convenience of manufacture, and to facilitate the connections of flexible cable members 60 with the flange member 64 on sleeve 22, each pair of the cable members 60 may comprise a single length of cable extending from one of the ferrules 62 axially through the chamber 53 and over one of the pulley members 54, thence extending through an opening 66 through flange 64 and then extending in a connecting cable portion 68 around 90 degrees of the circumference of sleeve 22, and then passing through another opening 66 in flange 64 and thence over another of the pulley members 54 and through the chamber 53, being connected at the other end to another of the ferrules 62. It will be appreciated that any number of different mechanical linkage arrangements can be employed to accomplish the purpose of the specific pulley-end-cable construction shown in the drawing and hereinabove described, without in any way departing from the present invention.

In the preferred structure shown in the drawings, the axial blow-apart force of the line fluid pressure tending to axially separate the sleeves 20 and 22 will be the result of the line pressure acting on a cross-sectional area defined in a radial plane within approximately the mean circumference of the smaller bellows member 28. In order that the amount of compensating force applied through cable members 60 tending to draw the sleeves 20 and 22 together should be approximately equal to the blow-apart force, it is desirable to have the pressure of fluid within chamber 53 act over a similar cross-sectional area between the bellows members 28 and 40. This area over which the compensating pressure acts is approximately equal to the annular cross-sectional area defined in a radial plane between the mean circumferences of the outer and inner bellows members 40 and 28, respectively.

Accordingly, in order to provide substantially complete compensation for the axial blow-apart force of line fluid pressure, it is preferred to provide a size relationship between the bellows members 28 and 40 such that the cross-sectional area defined in a radial plane within the mean circumference of the smaller bellows member 28 is approximately equal to the annular cross-sectional area defined in a radial plane between the mean circumferences of the outer and inner bellows members.

This relationship between the size of the inner bellows member 28 and the size of the outer bellows member 40 may, in a presently preferred form of the invention, be defined by the following approximate formula, wherein $D_1$ is the mean diameter of the inner bellows member 28 and $D_2$ is the mean diameter of the outer bellows member 40:

$$(D_2)^2 = 2(D_1)^2$$

or $$D_2 = \sqrt{2} D_1$$

It will be apparent from the drawing and from the foregoing description that the sleeves 20 and 22, and the respective tubes 12 and 14, are, because of the flexibility of the bellows members 28 and 40, freely flexible and shiftable relative to each other, being relatively movable axially, radially or angularly, and that regardless of such axial, radial or angular relative movement, the axial blow-apart force of line fluid pressure will be substantially compensated for through the cable linkage as above described.

It is also to be noted that the structure of the bellows members and internal linkage is all compactly arranged on the outside of the sleeves 20 and 22, whereby fluid flow through the flexible joint will not be interrupted by any internal obstructions, such as a universal joint, frequently utilized in other flexible joints.

While the instant invention has been shown and described herein in what is conceived to be the most practical and preferred embodiment, it is recognized that departures may be made therefrom within the scope of the invention which is therefore not to be limited to the details disclosed herein, but is to be accorded the full scope of the claims.

I claim:

1. A flexible and shiftable joint for fluid tight interconnection of adjacent tube ends, comprising: a first tube end; a first generally cylindrical bellows member mounted at one of its ends externally on said first tube end so as to protrude axially from said first tube end; a second tube end; a second generally cylindrical bellows member mounted at one of its ends externally on the second tube end, said second bellows member being disposed circumferentially about said second tube end within said first bellows member; a ring loosely disposed about said second tube end, said ring being connected at sealed, radially spaced connections to the other ends of said first and second bellows members, guide means mounted on said first pipe end; and elongated, flexible tension means secured at one end to said second tube end extending from said second tube end toward said first tube end, passing around said guide means and thence between said bellows members and being secured at its other end to said ring.

2. A joint as defined in claim 1, wherein the mounting of said first bellows member on said first tube end includes a collar member having a portion of restricted diameter connected to said first tube end, a portion of enlarged diameter connected to said first bellows member, and an intermediate portion flaring outwardly between said portion of restricted diameter and said portion of enlarged diameter.

3. A joint as defined in claim 1 wherein said guide means comprises a pulley rotatably mounted on said first tube end, and said elongated, flexible tension means comprises a cable member secured at one end to said second tube end, passing around said pulley, and secured at its other end to said ring.

4. A joint as defined in claim 3 which includes a plurality of said pulleys regularly spaced about said collar member, and a plurality of said cables passing around the respective said pulleys.

5. A joint as defined in claim 4 which includes a radially outwardly projecting flange on said second tube end to which said cables are attached.

6. A joint as defined in claim 5 wherein a pair of said cable members comprises a single length of cable connected at one end to said ring, extending around one of said pulleys, through said flange and around a portion of the periphery of said second tube end adjacent said flange and thence back through said flange and around another of said pulleys, and connected at its other end to said pressure ring.

7. A flexible and shiftable joint for fluid tight interconnection of adjacent tube ends which comprises: a first tube end; a collar member having a portion of restricted diameter connected to said first tube end, said collar member flaring outwardly from said portion of restricted diameter to an end portion of enlarged diameter; a first generally cylindrical bellows member mounted at one of its ends to said collar portion of enlarged diameter, said first bellows member protruding axially from said first tube end; a second tube end; a second generally cylindrical bellows member mounted at one of its ends externally on the second tube end, said second bellows member being of larger diameter than the second tube end and of smaller diameter than the first bellows member, and being disposed circumferentially about said second tube end within said first bellows member; a ring loosely disposed about said second tube end and being connected at sealed, radially spaced connections to the other ends of said first and second bellows members; a plurality of pulley members rotatably mounted on the inside of said collar member, said pulley members being regularly spaced about said collar member; and a plurality of flexible cable members, each being secured at one end thereof to said second tube end and extending from said second tube end toward said first tube end, passing around a respective pulley member and thence between said bellows members and being secured at its other end to said ring, the cross-sectional area defined in a radial plane within the mean circumference of the second bellows member being approximately equal to the annular cross-sectional area defined in a radial plane between the mean circumferences of the first and second bellows members, whereby the force of line pressure tending to spread the tube ends apart will be substantially counterbalanced by the counteracting force applied through said cable members tending to bring the tube ends into closer proximity.

8. A flexible and shiftable joint for fluid-tight interconnection of adjacent ends of first and second axially aligned tubes comprising: first and second open-ended, tubular bellows members disposed coaxially of the tubes, said second bellows member having a smaller mean diameter than said first bellows member and being nested within said first bellows member, a fluid-tight connection between each bellows member adjacent one end thereof and a respective tube end portion, a fluid-tight connection between said bellows members adjacent their other ends to complete fluid-tight interconnection of the tube ends, line pressure tending to spread the tube ends apart also exerting a force tending to expand the larger bellows member axially, and means within said joint extending between said bellows members and linking the larger bellows member adjacent its said other end with both tube ends for delivery and redirection of such force into axially directed contracting force tending to bring the tube ends into closer proximity.

References Cited in the file of this patent

UNITED STATES PATENTS

| | | |
|---|---|---|
| 2,314,776 | Dittus | Mar. 23, 1943 |
| 2,568,923 | McNeary | Sept. 15, 1951 |

FOREIGN PATENTS

| | | |
|---|---|---|
| 277,612 | Germany | Dec. 16, 1913 |
| 695,015 | Great Britain | Aug. 5, 1953 |